(12) United States Patent
Wolfe, Jr. et al.

(10) Patent No.: US 7,506,613 B2
(45) Date of Patent: Mar. 24, 2009

(54) ANIMAL TREAT METHOD

(75) Inventors: Jerry Joe Wolfe, Jr., San Antonio, TX (US); Harold Keith Benson, Hutto, TX (US); Robert Troy Dunn, Hutto, TX (US); Jessy B. Gabriel, Hutto, TX (US)

(73) Assignee: Triple Crown Dog Academy, Inc., Hutto, TX (US)

( * ) Notice: Subject to any disclaimer, the term of this patent is extended or adjusted under 35 U.S.C. 154(b) by 0 days.

(21) Appl. No.: 11/833,084

(22) Filed: Aug. 2, 2007

(65) Prior Publication Data

US 2007/0267382 A1 Nov. 22, 2007

Related U.S. Application Data

(62) Division of application No. 11/091,604, filed on Mar. 28, 2005, now Pat. No. 7,270,085.

(51) Int. Cl.
*A01K 29/00* (2006.01)
(52) U.S. Cl. .................................. 119/709
(58) Field of Classification Search ............ 119/707, 119/709, 710, 51.01, 54
See application file for complete search history.

(56) References Cited

U.S. PATENT DOCUMENTS

| | | | | |
|---|---|---|---|---|
| 5,947,061 | A | * | 9/1999 | Markham et al. ............ 119/710 |
| 6,076,486 | A | * | 6/2000 | Oliano ........................ 119/709 |
| 6,557,496 | B2 | * | 5/2003 | Herrenbruck ................ 119/707 |
| 6,634,318 | B1 | * | 10/2003 | Rucker ........................ 119/709 |
| 7,063,044 | B2 | * | 6/2006 | Handelsman et al. ........ 119/709 |
| 7,389,748 | B2 | * | 6/2008 | Shatoff et al. ................ 119/707 |
| 2004/0200434 | A1 | * | 10/2004 | Shatoff et al. ................ 119/707 |
| 2007/0044730 | A1 | * | 3/2007 | Axelrod et al. .............. 119/709 |

* cited by examiner

*Primary Examiner*—Kimberly S Smith
(74) *Attorney, Agent, or Firm*—Dillon & Yudell LLP; Brian F. Russell

(57) ABSTRACT

An animal treat method includes placing at least one animal treat into an interior compartment of a container having an opening through which the at least one animal treat can be dispensed. A first interlocking closure member is inserted at least partially within the interior compartment and extends through the opening to an exterior of the container. A second interlocking closure member is removably secured to the first interlocking closure member and over the opening, such that dispensing of animal treats from the interior compartment via the opening is impeded.

20 Claims, 3 Drawing Sheets

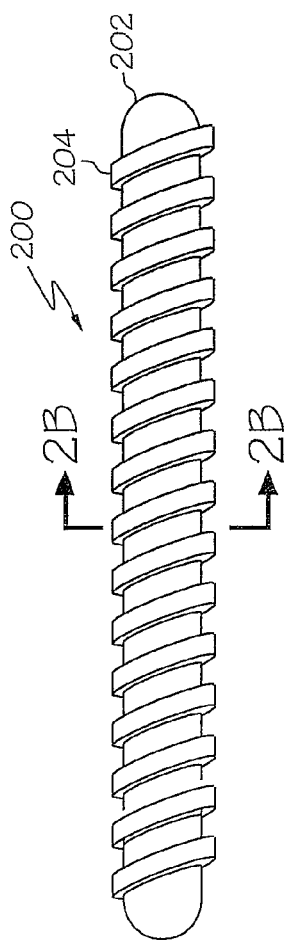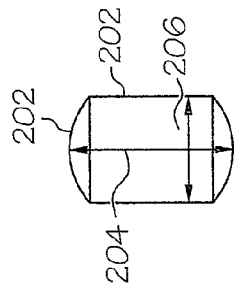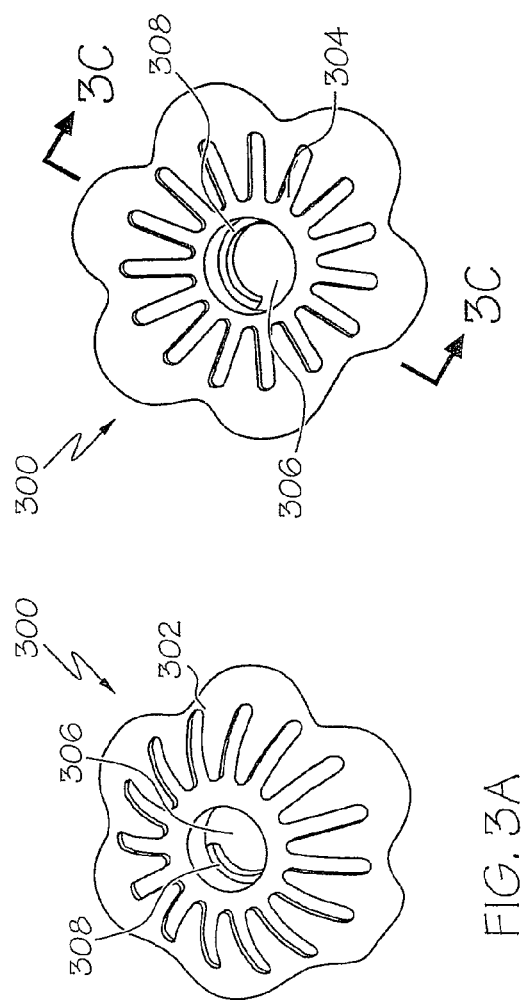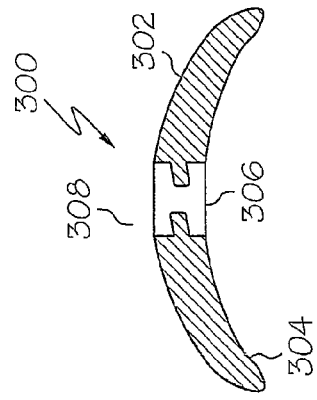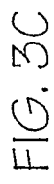

ANIMAL TREAT METHOD

CROSS-REFERENCE TO RELATED APPLICATION

The present application is a divisional of application U.S. patent application Ser. No. 11/091,604, filed on Mar. 28, 2005 now U.S. Pat. No. 7,270,085. The present application is also related to co-pending U.S. patent application Ser. No. 10/706,410, which is assigned to the assignee of the present invention and incorporated herein by reference in its entirety.

BACKGROUND OF THE INVENTION

1. Technical Field

The present invention relates in general to container apparatus and, in particular, to a container apparatus that dispenses items, such as edible treats. Still more particularly, the present invention is related to a closure for a container apparatus.

2. Description of the Related Art

It is well known in the art that boredom is a significant contributor to destructive behavior in domesticated animals. For example, U.S. Pat. No. 6,634,318 to Rucker and the prior art referenced therein disclose that barking, digging and other destructive behaviors are common problem behaviors of canines that become discontented or bored. As further disclosed in these patents, one common approach utilized in the art to address such destructive behaviors in dogs is to provide a toy that dispenses food (e.g., treats) from its hollow interior cavity through a hole as a dog interacts with the toy.

U.S. Pat. No. 6,634,318 to Rucker farther discloses the use of an edible plug to seal the hole through which the treats are dispensed from the interior cavity of the toy so that the treats do not prematurely spill out of the hole and the duration of a dog's interaction with the toy is extended. Rucker specifically teaches that it is desirable that the edible plug should be designed to be readily dislodged by the dog. Consequently, Rucker's plug is designed with a conic or cylindrical section and, when installed, has a larger diameter portion external to the toy and a smaller diameter portion inside the toy. This design permits the dog to easily remove the plug from the toy using its teeth, either by shearing the larger diameter portion from the smaller diameter portion or by pulling the plug out of hole.

SUMMARY OF THE INVENTION

The present invention recognizes that conventional edible plug designs such as that disclosed by Rucker in U.S. Pat. No. 6,634,318 are easily removed, particularly by large or aggressive dogs. Consequently, the toy will not present a challenge of any significant duration to such dogs and will not serve to alleviate the boredom for which such toys are touted as solutions. In view of the foregoing and other shortcomings in the art, the present invention provides an improved container apparatus, container closure, and method.

According to one embodiment, a container apparatus includes a container having an interior compartment and an opening communicating with the interior compartment. A first interlocking closure member extends at least partially within the compartment through the opening to an exterior of the container. A second interlocking closure member is removably secured to the first interlocking closure member and covering the opening, such that items placed within the interior compartment are restricted from being dispensed via the opening.

According to another embodiment, a closure apparatus for restricting access to an opening of a container includes a first interlocking closure member having an elongate body having at least one external thread and an edible second interlocking closure member. The edible second interlocking closure member has a body sized to restrict access to an opening in a container. The body has a threaded recess having at least one internal thread formed therein to removably couple the second interlocking closure member to the first interlocking closure member by engaging the external thread of the first interlocking closure member.

According to yet another embodiment, an animal treat method includes placing at least one animal treat into an interior compartment of a container having an opening through which the at least one animal treat can be dispensed. A first interlocking closure member is inserted at least partially within the interior compartment and extends through the opening to an exterior of the container. A second interlocking closure member is removably secured to the first interlocking closure member and over the opening, such that dispensing of animal treats from the interior compartment via the opening is impeded.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 2A depicts a plan view of a first interlocking closure member in accordance with the present invention;

FIG. 2B illustrates a section view of the first interlocking closure member of FIG. 2A;.

FIG. 3A depicts a top view of a second interlocking closure member in accordance with the present invention;

FIG. 3B illustrates a bottom view of the second interlocking closure member of FIG. 3A;

FIG. 3C is a section view of the second interlocking closure member of FIGS. 3A-3B.

DETAILED DESCRIPTION OF ILLUSTRATIVE EMBODIMENT

Figure 1B:
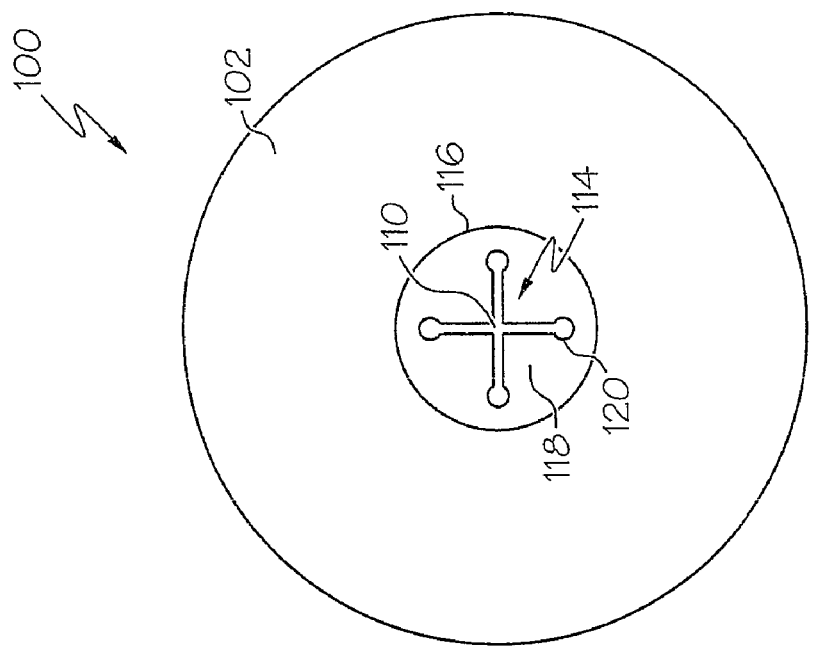
FIG. 1B is a plan view of the container of FIG. 1A.
Figure 1A:
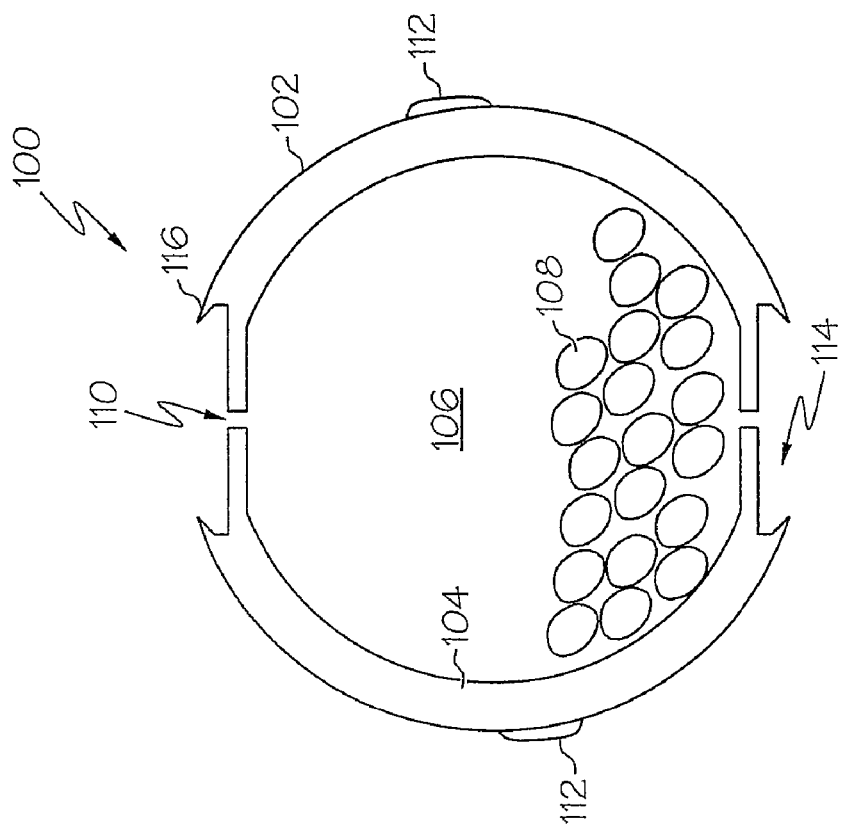
FIG. 1A is a section view of a container in accordance with one embodiment of the present invention.

With reference now to the figures and in particular with reference to FIGS. 1A and 1B, there are illustrated a section view and plan view, respectively, of a container 100 in accordance with one embodiment of the present invention. Container 100 includes an exterior surface 102 and an interior surface 104 that defines one or more interior compartments 106 for holding items 108, such as edible and/or nutritious animal treats. Interior surface 104 and exterior surface 102 have at least one communicating opening 110 through which items 108 may be dispensed from the compartment 106 of container 100.

In one embodiment, opening 110 takes the form of two orthogonal slits having tear-resistant lobes 120 at each of the four slit ends. Opening 110 thus defines four symmetrical, evenly spaced flaps 118. The configuration of flaps 118 and opening 110 allows form(s) used to create the interior surface 104 of container 100 to easily be removed following fabrication of container 100 and allows the user to easily insert items 108 and/or other objects into container 100 while preventing items 108 from being too readily released from compartment 106. Obviously, any size, shape, or number of flaps 118 may be used as may be desired and/or convenient.

Container 100 may be made of any substance or combination of substances now known or hereafter developed. In one preferred embodiment, container 100 is formed of a deformable yet durable, tear resistant plastic-like and/or rubber-like material. Preferably, container 100 is highly resilient and highly resistant to permanent deformation and destruction, for example, when chewed and/or clawed upon by an animal, such as a dog. Container 100 and interior and exterior surfaces 102 and 104 may be molded in any desired shape, for example, rectangular, circular, cylindrical, spherical, prismatic, oblong, ovoid and/or irregular. In the illustrated embodiment, container 100 is substantially, but not precisely spherical and includes at least one at least partially circumferential raised element 110 on exterior surface 102 to promote irregular rolling motion. As used herein, the term "container" or "ball" includes any of the foregoing or other desired shapes.

As further illustrated in FIGS. 1A and 1B, exterior surface 102 of container 100 further defines a recess 114 at the location of at least one of the one or more openings 110. Recess 114 may advantageously, but not necessarily be circular, elliptical, or ovoid in shape. At its upper extent, recess 114 defines a circumferential lip 116 at least partially and preferably fully surrounding opening 110 that is capable of receiving and retaining a removable cap for restricting the dispensing of items from container 100. The removable cap may take any shape in section or plan now known or hereafter developed or desired. For example, as described further below with reference to FIGS. 3A-3C, the removable cap may be dome-shaped to facilitate rolling container 100. The removable cap may also be edible and may further be an edible animal treat or animal food, such as a dog treat or food. In embodiments in which multiple openings 110 are provided, at least one removable cap may be edible and at least one removable cap may be inedible and intended for semi-permanent installation.

Referring now to FIGS. 2A-2B, there are depicted plan and section views, respectively, of a first interlocking closure member 200 in accordance with one embodiment of the present invention. As depicted, first interlocking closure member 200 has an elongate body 202 having external threads 204 formed thereon. First interlocking closure member 200 preferably, but not necessarily has a length greater than a diameter of container 100 measured at an opening 110. External threads 204 are preferably formed on elongate body 202 at least adjacent to its two ends and may, as shown, be formed on substantially the entire length of elongate body 202. Although elongate body 202 and threads 204 of first interlocking closure member 200 maybe formed with a substantially circular cross-section, first interlocking closure member 200 may alternatively have a non-radially symmetric cross-section that has at least one larger diameter and at least one smaller diameter. For example, as shown in FIG. 2B, which illustrates a section of first interlocking closure member 200 along line 2-2, elongate body 202 has a substantially rectangular cross-section, and the overall cross-section of first interlocking closure member 200 has a larger diameter 204 inclusive of threads 202 and a smaller diameter 206 having threads 202 of smaller (or no) radial dimension. As will be appreciated from the description of FIGS. 4A and 4B below, a non-radially symmetric cross-section facilitates the insertion into and removal of first interlocking closure member 200 from container 100 via opening(s) 110. First interlocking closure member 200 can be made utilizing any known or hereafter discovered technique, for example, by injection molding.

First interlocking closure member 200 is preferably formed of a rigid or substantially rigid material. The material may be a non-ingestible material such as a plastic or an edible food product. In a particularly preferred embodiment, first interlocking closure member 200 is formed entirely of a gluten-based food product that is not only edible by an animal without harm, but is also nutritious. As the terms are employed herein, distinction is made and observed between the terms "ingestible", "edible", and "nutritious". In particular, "ingestible" is used to identify items that, with respect to a particular animal, are sized and configured such that they can be ingested or swallowed. Not all items that are "ingestible" are "edible" or "nutritious". "Edible" is defined herein to identify a subset of ingestible items that are not harmful to the intended ingesting animal. Edible items need not be nutritious or beneficial to the ingesting animal. Finally, the term "nutritious" is utilized to identify ingestible and edible items that are beneficial to the health of the intended ingesting animal.

With reference now to FIGS. 3A-3C, there are illustrated top, bottom and section views of a second interlocking closure member 300 in accordance with one embodiment of the present invention. Second interlocking closure member 300 is preferably sized and shaped to fit snugly within recess 114 and be retained by lip 116. For example, FIGS. 3A-3C illustrate an embodiment in which second interlocking closure member 300 has a maximum perimeter that describes a substantially circular shape. Of course, other regular or irregular shapes of second interlocking closure member 300 could be employed for embodiments of recess 114 having circular or other configurations.

The illustrated embodiment of second interlocking closure member 300 has a domed cross-section, as particularly shown in FIG. 3C, which illustrates a section of second interlocking closure member 300 along line 3-3. In this embodiment, second interlocking closure member 300 has a generally convex first surface 302 and a generally concave second surface 304. One or more of the first and second surfaces 302 and 304 may alternatively be flat or irregular in profile, and one or more first and second surfaces 302 may be textured or otherwise molded to facilitate gripping or biting by an animal's teeth. A threaded recess 306 having at least one thread 308 is formed and sized within second interlocking closure member 300 to permit it to be threadedly coupled to first interlocking closure member 200, as described further below. Threaded recess 306 may advantageously, but not necessarily be realized as a centrally located through hole as shown.

Second interlocking closure member 300 is preferably injection molded or otherwise formed of a rigid or semi-rigid edible or nutritious food product, such as a wheat gluten-based food product. Of course, first and second interlocking closure members 200, 300 may alternatively or additionally be formed of other nutritious food products including rice, corn, and/or other grains and meat(s).

Figure 4B:
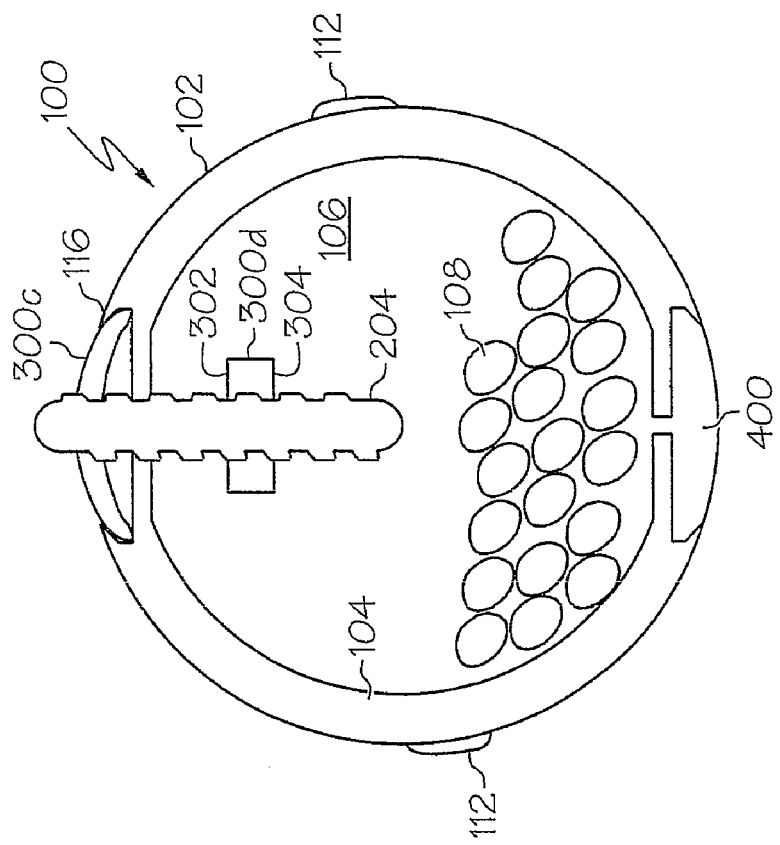
FIGS. 4A and 4B are section views of a container with first and second interlocking closure members installed in accordance with the present invention.
Figure 4A:
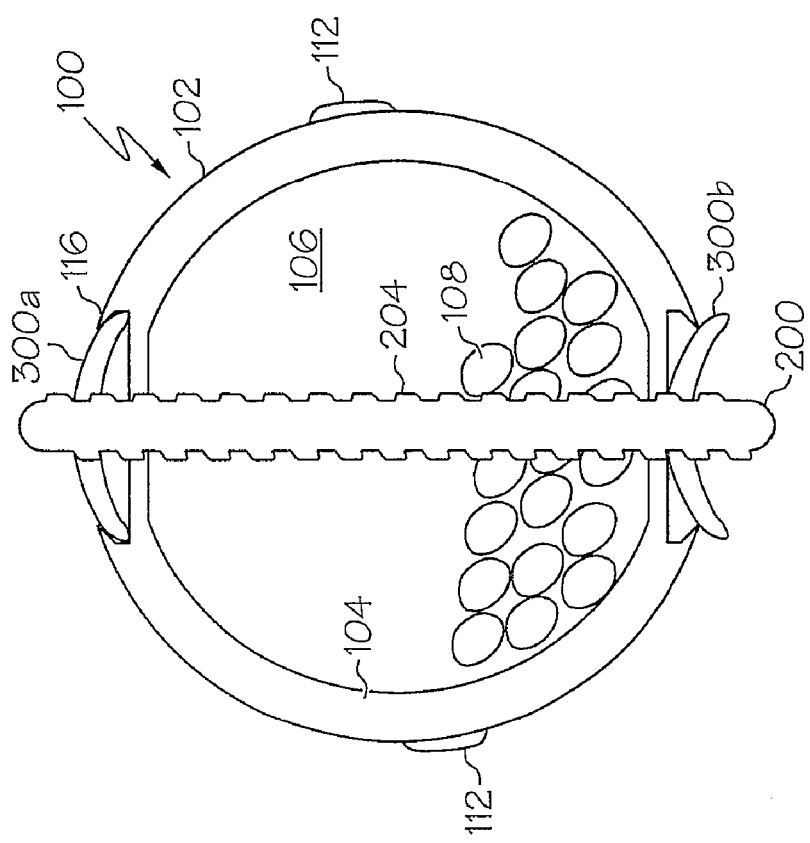

Referring now to FIG. 4A, there is depicted a first section view of a container 100 with first and second interlocking closure members 200, 300 installed in accordance with the present invention. In use, a user inserts items 108, such as edible and/or nutritious animal treats, within the interior compartment(s) 106 of container 100. Thereafter, the user installs a second interlocking closure member 300a in place within each of one or more recesses 114 so that each second interlocking closure member 300 is retained by the lip 116 of its respective recess 114 and restricts the dispensing of items 108 from container 100 by blocking an opening 110. As indicated in FIG. 4A, the user may alternatively or additionally install at least one second interlocking closure member 300b so that it blocks an opening 114 of container 100 but is not retained by a lip 116. This alternative or additional installation of a second interlocking closure member 300b facilitates the removal of second interlocking closure member 300b, for example, through a dog or other animal chewing or licking second interlocking closure member 300b. The user can then optionally increase the length of interaction of an animal with container 100 by threading the first interlocking closure member 200 within the threaded recess 306 of one or more second interlocking closure members 300a, 300b so that the second interlocking closure member(s) 300 is/are removably secured to the first interlocking closure member 200 by at least one internal thread of each second interlocking closure member 300 engaging at least one external thread of the first interlocking closure member 200. For example, FIG. 4A depicts a first interlocking closure member 200 threaded through two second interlocking closure members 300a, 300b, increasing the security with which the second interlocking closure members 300a, 300b are retained covering openings 110.

With reference now to FIG. 4B, there is depicted a second section view of a container 100 with first and second interlocking closure members 200, 300 installed in accordance with the present invention. In this installation, a user inserts items 108, such as edible and/or nutritious animal treats, within the interior compartment(s) 106 of container 100. The user then threads a second interlocking closure member 300d a selected distance onto a distal end of first interlocking closure member 200. It should be noted that in the illustrated embodiment second interlocking closure member 300d has flat parallel first and second surfaces 302, 304 and thus no domed profile. The user then inserts the distal end of first interlocking closure member 200 and second interlocking closure member 300d through opening 110 into compartment 106 of container 100. The user thereafter threads another second interlocking closure member 300c onto the proximal end of first interlocking closure member 200 a selected distance to restrict external access to opening 110. Second interlocking closure member 300c can be, but need not be installed snugly against exterior surface 102 of container 100. As indicated in FIG. 4A, second interlocking closure member 300c can be selectively installed with either of its first and second surfaces 302, 304 outwardly facing. Assuming that the user installs second interlocking closure member 300c with its first surface 302 outwardly facing, second interlocking closure member 300c may, if desired, be retained by the lip 116 of its respective recess 114. A non-ingestible, non-edible cap 400 may further be installed to block access to at least one opening 110.

In either of the installations shown in FIGS. 4A and 4B, an animal, for example, a dog, interacts with container 100. For example, the dog may roll, push, lick and/or bite container 100 and/or first and second interlocking closure elements 200, 300. The taste and/or scent of first and second interlocking closure members 200, 300 and/or items 108 preferably encourages the dog to attempt to remove and/or eat first and second interlocking closure members 200, 300. Depending upon the selected installation of first and second interlocking closure members 200, 300, the dog is presented with a varying level of challenge to eat and or remove first and/or second interlocking closure members 200, 300. Thereafter, as the animal continues to play with container 100, items 108, which are preferably edible and nutritious animal treats, are dispensed from compartment 106 via one or more openings 110, further rewarding the animal's interaction. Once all items 108 and first and second interlocking closure members 200, 300 have been removed and/or eaten, container 100 may be reconfigured with items 108 and a new interlocking first and second closure members 200, 300.

While the invention has been particularly shown as described with reference to a preferred embodiment, it will be understood by those skilled in the art that various changes in form and detail may be made therein without departing from the spirit and scope of the invention. For example, because one or more elements used with the present invention (e.g., first and second interlocking members 200, 300 and items 108) maybe edible, it is contemplated that various groups of one or more elements that may be used with the present invention (e.g., container 100, first interlocking member 200, second interlocking member(s) 300 and/or items 108) may be sold separately or packaged together.

In addition, it will be appreciated that the first interlocking closure member need not have a uniform radial diameter or uniform larger and smaller diameters over its entire length. For example, in an alternative embodiment of the present invention, one end of the first interlocking closure member may be of greater radial diameter than the other, and the larger diameter end may be sufficient size relative to the size or shape of an opening 114 to effectively prevent that end from easily passing through an opening 110, thereby retaining that end of the first interlocking closure member either inside of compartment 106 or outside of container 100 (until consumed or removed by adequate interaction with an animal). Consequently, in this embodiment, a second interlocking closure member 300 may be retained in place over the inside or outside of an opening 114 by the first interlocking closure member without the concurrent use of another second interlocking closure member 300.

What is claimed is:

1. An animal treat method comprising:
    placing at least one animal treat into an interior compartment of a container, said containing having an opening through which the at least one animal treat can be dispensed;
    inserting a first interlocking closure member at least partially within the interior compartment and extending through said opening to an exterior of said container; and
    removably securing a second interlocking closure member to said first interlocking closure member and over said opening, such that dispensing of animal treats from said interior compartment via said opening is impeded, wherein removably securing a second interlocking closure member to said first interlocking closure member comprises removably securing an edible second interlocking closure member to said first interlocking closure member.

2. The method of claim 1, wherein inserting a first interlocking closure member at least partially within the interior compartment and extending through said opening to an exterior of said container comprises inserting an edible first interlocking closure member at least partially within the interior compartment and extending through said opening to an exterior of said container.

3. The method of claim 1, wherein:
the first interlocking closure member has at least one first thread;
said second interlocking closure member has at least one second thread; and
said step of removably securing comprises removably securing the second interlocking closure member to said first interlocking closure member by engaging said at least one first thread of the first interlocking closure member with said at least one second thread of said second interlocking closure member.

4. The method of claim 3, wherein:
the second interlocking closure member defines a through hole including said at least one second thread; and
said step of removably securing comprises engaging said at least one first thread of the first interlocking closure member with said at least one second thread of said second interlocking closure member in said through hole.

5. The method of claim 1, wherein removably securing a second interlocking closure member to said first interlocking closure member comprises removably securing a dome shaped second interlocking closure member to said first interlocking closure member.

6. The method of claim 1, wherein:
said first interlocking closure member comprises a proximal end and a distal end; and
removably securing a second interlocking closure member to said first interlocking closure member comprises removably securing the second interlocking closure member toward the proximal end and removably securing another second interlocking closure member toward the distal end.

7. The method of claim 1, wherein:
said opening is a first opening;
said container has a second opening that communicates with said interior compartment;
said inserting comprises inserting the first interlocking closure member so that the distal end of the first interlocking closure member extends through said second opening to an exterior of said container.

8. The method of claim 1, wherein said removably securing comprises removably securing said second interlocking closure member to said first interlocking closure member on a portion of said first interlocking closure member disposed within said interior compartment.

9. The method of claim 1, wherein:
said container has an exterior surface defining a recess at said opening and a lip at least partially surrounding said opening; and
said method further comprises at least partially retaining said second interlocking closure member within said recess by said lip.

10. The method of claim 1, further comprising impeding dispensing of animal treats from the container by at least one flap limiting a size of said opening.

11. An animal treat method comprising: placing at least one animal treat into an interior compartment of a container, said containing having an opening through which the at least one animal treat can be dispensed;
inserting a first interlocking closure member at least partially within the interior compartment and extending through said opening to an exterior of said container; and
removably securing a second interlocking closure member to said first interlocking closure member and over said opening, such that dispensing of animal treats from said interior compartment via said opening is impeded
wherein:
said first interlocking closure member has an elongate body having distal and proximal ends and a long axis extending therebetween;
said first interlocking closure member has a large diameter and a smaller diameter both orthogonal to the long axis of said elongate body; and
said step of removably securing comprises removably securing said second interlocking closure member at one of a set including said distal and proximal ends.

12. An animal treat method comprising:
placing at least one animal treat into an interior compartment of a container, said containing having an opening through which the at least one animal treat can be dispensed;
inserting an edible first interlocking closure member at least partially within the interior compartment and extending through said opening to an exterior of said container; and
removably securing an edible second interlocking closure member to said first interlocking closure member and over said opening, such that dispensing of animal treats from said interior compartment via said opening is impeded.

13. The method of claim 12, wherein:
the first interlocking closure member has at least one first thread;
said second interlocking closure member has at least one second thread; and
said step of removably securing comprises removably securing the second interlocking closure member to said first interlocking closure member by engaging said at least one first thread of the first interlocking closure member with said at least one second thread of said second interlocking closure member.

14. The method of claim 13, wherein:
the second interlocking closure member defines a through hole including said at least one second thread; and
said step of removably securing comprises engaging said at least one first thread of the first interlocking closure member with said at least one second thread of said second interlocking closure member in said through hole.

15. The method of claim 12, wherein removably securing a second interlocking closure member to said first interlocking closure member comprises removably securing a dome shaped second interlocking closure member to said first interlocking closure member.

16. The method of claim 12, wherein:
said first interlocking closure member comprises a proximal end and a distal end; and
removably securing a second interlocking closure member to said first interlocking closure member comprises removably securing the second interlocking closure member toward the proximal end and removably securing another second interlocking closure member toward the distal end.

17. The method of claim 12, wherein:
said opening is a first opening;
said container has a second opening that communicates with said interior compartment;
said inserting comprises inserting the first interlocking closure member so that the distal end of the first interlocking closure member extends through said second opening to an exterior of said container.

18. The method of claim 12, wherein said removably securing comprises removably securing said second interlocking closure member to said first interlocking closure member on a portion of said first interlocking closure member disposed within said interior compartment.

19. The method of claim 12, wherein:

said container has an exterior surface defining a recess at said opening and a lip at least partially surrounding said opening; and said method further comprises at least partially retaining said second interlocking closure member within said recess by said lip.

20. The method of claim 12, further comprising impeding dispensing of animal treats from the container by at least one flap limiting a size of said opening.

\* \* \* \* \*